(12) United States Patent
Conde

(10) Patent No.: US 12,448,917 B2
(45) Date of Patent: *Oct. 21, 2025

(54) COMBINED HEAT AND POWER SYSTEM USING AND PRODUCING CO2 AND METHOD OF OPERATION

(71) Applicant: Enexor BioEnergy, LLC, Franklin, TN (US)

(72) Inventor: Ricardo Conde, New Salem, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/760,805

(22) Filed: Jul. 1, 2024

(65) Prior Publication Data

US 2024/0401522 A1    Dec. 5, 2024

Related U.S. Application Data

(63) Continuation of application No. 18/203,973, filed on May 31, 2023, now Pat. No. 12,044,166.

(51) Int. Cl.
*F02C 3/34*    (2006.01)
*F02C 3/26*    (2006.01)
(Continued)

(52) U.S. Cl.
CPC ............... *F02C 3/34* (2013.01); *F02C 3/26* (2013.01); *F02C 3/28* (2013.01); *F02C 3/30* (2013.01); *F02C 7/232* (2013.01)

(58) Field of Classification Search
CPC ...... F02C 3/26; F02C 3/28; F02C 3/30; F02C 3/34; F02C 7/232
See application file for complete search history.

(56) References Cited

U.S. PATENT DOCUMENTS

| 10,174,639 B2 | 1/2019 | Klosinski et al. |
| 10,337,357 B2 | 7/2019 | Mathai et al. |

(Continued)

OTHER PUBLICATIONS

Barsali et al., Externally fired micro gas turbine (75kWe) for combined heat and power generation from solid biomass: Concept, efficiency, cost, and experiences from pilot and commercial plants in Italy. Slideshow, Universita di Pisa, Department of Electrical Systems and Automation. Holzenergie-Symposium. 16 pages, Sep. 17, 2010.

(Continued)

*Primary Examiner* — William H Rodriguez
(74) *Attorney, Agent, or Firm* — McCarter & English LLP; Dave S. Christensen

(57) ABSTRACT

A combined heat and power (CHP) system and a method of operating is provided. The CHP system includes an oxygen-air separation device. A combustion chamber has an inlet coupled to the oxygen-air separation device. The combustion chamber receives an expanded heated CO2 working gas for combustion of solid fuel and generates a CO2 exhaust gas. The expanded heated CO2 working gas comprising at least a portion of the CO2 exhaust gas. A heat exchanger receives combustion gases and outputs a cooled CO2 working gas. A turbine is provided having a compression section and an expansion section, the compression section configured to receive and compress the cooled CO2 working gas and to direct it to the heat exchanger. The turbine receives a heated CO2 working gas at the expansion section and expands the heated CO2 working gas. In an embodiment, CO2 products may be generated from the system.

21 Claims, 2 Drawing Sheets

(51) Int. Cl.
*F02C 3/28* (2006.01)
*F02C 3/30* (2006.01)
*F02C 7/232* (2006.01)

(56) References Cited

U.S. PATENT DOCUMENTS

| | | |
|---|---|---|
| 10,443,495 B2 | 10/2019 | Conde |
| 10,730,281 B2 | 8/2020 | Mironets et al. |
| 10,731,557 B1 | 8/2020 | Himmelmann |
| 10,876,424 B2 | 12/2020 | Himmelmann |
| 11,280,322 B1 | 3/2022 | Bodishbaugh et al. |
| 11,326,550 B1 | 5/2022 | Bodishbaugh et al. |
| 11,480,074 B1 | 10/2022 | Bodishbaugh et al. |
| 11,578,652 B2 | 2/2023 | Conde |
| 12,044,166 B1 * | 7/2024 | Conde ................. F02C 3/30 |
| 2011/0167866 A1 | 7/2011 | Evans-Beauchamp |
| 2016/0138431 A1 | 5/2016 | Lear, Jr. |
| 2018/0298816 A1 | 10/2018 | Conde |
| 2019/0063319 A1 | 2/2019 | Forrest |
| 2021/0047963 A1 | 2/2021 | Conde |
| 2023/0417187 A1 | 12/2023 | Lear |

OTHER PUBLICATIONS

Chen et al., Thermodynamic optimization of an open cycle of an externally fired micro gas turbine. Part 2: Performance optimization. International Journal of Low-Carbon Technologies. 2014;9:189-194.

Kautz et al., The Externally Fired Gas Turbine (EFGT-Cycle) and Simulation of the Key Components. Retrieved online at: http://api.semanticscholar.org/CorpusID:140115801. 10 pages, (2002).

International Search Report and Written Opinion for Application No. PCT/US2024/031787, dated Jun. 25, 2024, 7 pages.

* cited by examiner

COMBINED HEAT AND POWER SYSTEM USING AND PRODUCING CO2 AND METHOD OF OPERATION

CROSS-REFERENCE TO RELATED APPLICATION

This application is a continuation of U.S. patent application Ser. No. 18/203,973 filed May 31, 2023 and entitled "COMBINED HEAT AND POWER SYSTEM USING AND PRODUCING CO2 AND METHOD OF OPERATION," the contents of which is incorporated by reference herein in their entirety.

TECHNICAL FIELD

The subject matter described herein relates to a combined heat and power system, in particular to a thermal system utilizing waste organic resources and converting it into heat energy used to drive a gas turbine coupled to the thermal system to produce power and a high level of usable waste heat for both low and high temperature thermal applications.

BACKGROUND

Combined heat and power (CHP) systems have been utilized in many forms for over 100 years. The most common are fossil fuel fired systems that use, for example, steam turbines, gas fired turbines and internal combustion engines to produce electrical power. The reject heat from these systems can be used for a wide range of applications such as heating, cooling and in some cases where the waste heat temperature is high enough can be used to drive a second cycle. Most of the focus for traditional CHP systems has been large fossil fueled fired systems connected to district heating systems. Over the past 30 years the focus moved to smaller distributed CHP systems where the heat or power generated could be better utilized by the end user. These systems have also been fossil fueled fired systems that commonly use small gas turbines or reciprocating engines to produce power along with usable waste heat from the cycle. Other systems that use Organic Rankine Cycle have also been used although the quality of the waste heat is relatively low which limits the applications for use of the generated heat.

More recently, the focus to use renewable organic waste streams for fuel has been desired. Large biomass and municipal solid waste to power systems have been in operation for many decades. The ability to utilize a wide variety of organic sources in a small CHP system (for example, less than 1 MW electric) has been challenging for a number of reasons. There have been many small organic to power conversion technologies that have been utilized to varying degrees of success. Gasification of organics into a synthesis gas ("syngas") has been one approach to convert a solid fuel into a hydrocarbon gas for combustion in traditional power systems. Unfortunately, these systems can be costly, especially when scaled to smaller power/heat applications. In addition, the organic feed stock can present particular challenges in application. For example, depending on the gasification method and conversion efficiencies, the potential energy available in some organic materials suffer from losses that have an economic impact on the cost of power and heat. Gasification of mixed organic residues may be particularly problematic for many gasification systems.

Another method applied for small CHP applications has been to use direct combustion of the organics through an appropriate combustor and using the heat through a heat exchanger to drive an externally fired engine. Traditional externally fired systems include Stirling cycle, Steam Rankine, Organic Rankine, and super critical CO2 cycles. In all of these systems the temperature of the reject heat affects the cycle efficiency. The higher the reject heat temperature the lower the power efficiency. With the exception of the steam cycle the other thermodynamic cycles typically lose efficiency when producing even hot water at 90° C. However, with the steam cycle, the deficiency is the complexity and cost associated with a high pressure steam circuit in a small application.

Another method that has been employed is to use an open Brayton cycle gas turbine and introduce heat indirectly through a heat exchanger. Several systems have been tested where a small turbine has been coupled to an organic combustion system. In these systems ambient air is compressed in the compressor of the turbine and then directed to a recuperator to heat the compressor air. The compressed is heated by the organic combustion system. The highly heated air is then expanded in the turbine to produce work to turn a generator and generate electricity. Continuing the cycle, the hot turbine air is used for preheating combustion air. The turbine exhaust hot gases may then be exhausted or directed to a further heat exchanger where usable waste heat can be extracted.

In some instances there has also been a focus on reducing, capturing and sequestering $CO_2$ from power plant emissions. There are several methods to extract $CO_2$ from exhaust gases including adsorption, membrane, cryogenic and electro chemical. Each of these systems represent a significant capital cost in addition to the energy consumption to capture $CO_2$ from the exhaust gas.

Another method to eliminate the need to extract $CO_2$ from the exhaust gas is to use an oxygen-fuel ("oxy-fuel") combustion system. In this system oxygen is separated from air and used to oxidize the hydrocarbon producing $CO_2$ and water. Oxy-fuel systems are used in glass, steel and ceramic industries to eliminate NOx associated with high temperature furnaces. Few oxy-fuel power systems have been developed, notably the Allam cycle which uses an oxy-fuel burner with gaseous fuels in a super critical CO2 cycle. Oxy-fuel systems have not been introduced to handle solid organic materials such as biomass, plastics and other organic residues.

Accordingly, while existing CHP systems are suitable for their intended purpose the need for improvement remains, particularly in providing a CHP system having the features described herein BRIEF SUMMARY According to one aspect of the disclosure a combined heat and power (CHP) system is provided. The CHP system comprising: an oxygen-air separation device; a combustion system having a combustion chamber and a feed mechanism configured to feed solid fuel into the combustion chamber, the combustion chamber having an gas inlet for combustion and a combustion gas exhaust, gas inlet being fluidly coupled to the oxygen-air separation device, the combustion chamber being configured to receive an expanded heated $CO_2$ working gas to the gas inlet for combustion of the solid fuel, the combustion chamber configured to generate a $CO_2$ exhaust gas that substantially comprises $CO_2$ gas; a first proportional valve fluidly coupled to the gas inlet and configured to control the flow of the heated expanded $CO_2$ working gas thereto, the heated expanded $CO_2$ working gas comprising at least a portion of the $CO_2$ exhaust gas; an exhaust plenum operatively connected to the combustion chamber and configured to receive high temperature combustion gases therefrom; a high temperature heat exchanger operably coupled to the exhaust plenum and configured to receive combustion gases therefrom and output a cooled $CO_2$ working gas, the high temperature heat exchanger operable to transfer heat from the combustion gases to a compressed $CO_2$ working gas; and a gas turbine having a compression section and an expansion section operably connected on a drive shaft, the compression section configured to receive the cooled $CO_2$ working gas at an inlet and compress the cooled $CO_2$ working gas and to direct the compressed $CO_2$ working gas to an inlet of the high temperature heat exchanger, the gas turbine configured to receive a heated $CO_2$ working gas at an inlet to the expansion section to expand the heated $CO_2$ working gas and generate work therefrom.

In addition to one or more of the features described herein, or as an alternative, further embodiments of the CHP system may include a mixing plenum fluidly coupled between the combustion chamber and the exhaust plenum, the mixing plenum being fluidly coupled to the expansion section.

In addition to one or more of the features described herein, or as an alternative, further embodiments of the CHP system may include a second proportional valve coupled between the expansion section and the mixing plenum.

In addition to one or more of the features described herein, or as an alternative, further embodiments of the CHP system may include a temperature sensor, the temperature sensor operable to sense the temperature of the combustion gases at the combustion gas exhaust.

5 In addition to one or more of the features described herein, or as an alternative, further embodiments of the CHP system may include the temperature sensor being at least one of a thermocouple, infrared detector and a semiconductor detector.

In addition to one or more of the features described herein, or as an alternative, further embodiments of the CHP system may include a mixing valve fluidly coupled to the first proportional valve, the oxygen-air separation unit, and the gas inlet.

In addition to one or more of the features described herein, or as an alternative, further embodiments of the CHP system may include the mixing valve being further fluidly coupled to a gas fuel source.

In addition to one or more of the features described herein, or as an alternative, further embodiments of the CHP system may include a control valve fluidly coupled between an outlet of the high temperature heat exchanger and gas turbine inlet, the control valve being configured to extract a portion of the cooled $CO_2$ working gas.

In addition to one or more of the features described herein, or as an alternative, further embodiments of the CHP system may include an external process device fluidly coupled to the control valve.

1 In addition to one or more of the features described herein, or as an alternative, further embodiments of the CHP system may include the external process device includes a filter device configured to output a purified $CO_2$ gas.

In addition to one or more of the features described herein, or as an alternative, further embodiments of the CHP system may include the external process device further including at least one of: a compressor, a compressed gas storage system, a $CO_2$ liquefaction system, a dry ice generator, and a solid carbon conversion process.

In addition to one or more of the features described herein, or as an alternative, further embodiments of the CHP system may include an oxygen sensor arranged to measure a gas between the exhaust plenum and the high temperature heat exchanger.

In addition to one or more of the features described herein, or as an alternative, further embodiments of the CHP system may include a high temperature particle separator having an inlet and an exhaust, the high temperature particle separator fluidly coupled to the combustion chamber and configured to receive high temperature combustion gases therefrom, high temperature particle separator further including the exhaust plenum.

In addition to one or more of the features described herein, or as an alternative, further embodiments of the CHP system may include the high temperature particle separator including at least one cyclonic separator, the cyclonic separator operably coupled to a hopper for removal of particulate matter.

According to another aspect of the disclosure a method of operating a combined heat and power (CHP) system is provided. The method comprises: during a startup mode, initiating a combustion process in a combustion chamber and combusting a solid fuel with an oxygen-fuel gas to generate an exhaust gas comprised of substantially $CO_2$ gas; regulating a temperature of the high temperature combustion gases from the combustion chamber with an expanded heated $CO_2$ working gas to yield a mixed $CO_2$ combustion gas; transferring with a heat exchanger thermal energy from the mixed $CO_2$ combustion gas and generate a cooled $CO_2$ working gas; compressing the cooled $CO_2$ working gas to generate a compressed $CO_2$ working gas; heating the compressed $CO_2$ working gas with the thermal energy to generate a compressed heated $CO_2$ working gas; and expanding the compressed heated $CO_2$ working gas and generating work thereby.

In addition to one or more of the features described herein, or as an alternative, further embodiments of the method may include during the startup mode, generating oxygen gas and mixing a fuel gas to generate the oxygen-fuel gas.

In addition to one or more of the features described herein, or as an alternative, further embodiments of the method may include the fuel being at least one of propane, natural gas, or methane.

In addition to one or more of the features described herein, or as an alternative, further embodiments of the method may include, during an operating mode, flowing at least a portion of the expanded heated $CO_2$ working gas to the combustion chamber.

In addition to one or more of the features described herein, or as an alternative, further embodiments of the method may include, during the operating mode, extracting at least a portion of cooled $CO_2$ working gas.

In addition to one or more of the features described herein, or as an alternative, further embodiments of the method may include the amount of cooled $CO_2$ working gas extracted being selected to maintain a substantially constant pressure within the system.

In addition to one or more of the features described herein, or as an alternative, further embodiments of the method may include compressing and storing the portion of cooled $CO_2$ working gas.

In addition to one or more of the features described herein, or as an alternative, further embodiments of the method may include filtering the portion of cooled $CO_2$ working gas.

In addition to one or more of the features described herein, or as an alternative, further embodiments of the method may include liquefying the portion of cooled CO2 working gas.

In addition to one or more of the features described herein, or as an alternative, further embodiments of the method may include forming dry ice from the portion of cooled working gas.

In addition to one or more of the features described herein, or as an alternative, further embodiments of the method may include performing a welding operation with the portion of cooled working gas.

Other aspects, features, and techniques of embodiments will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
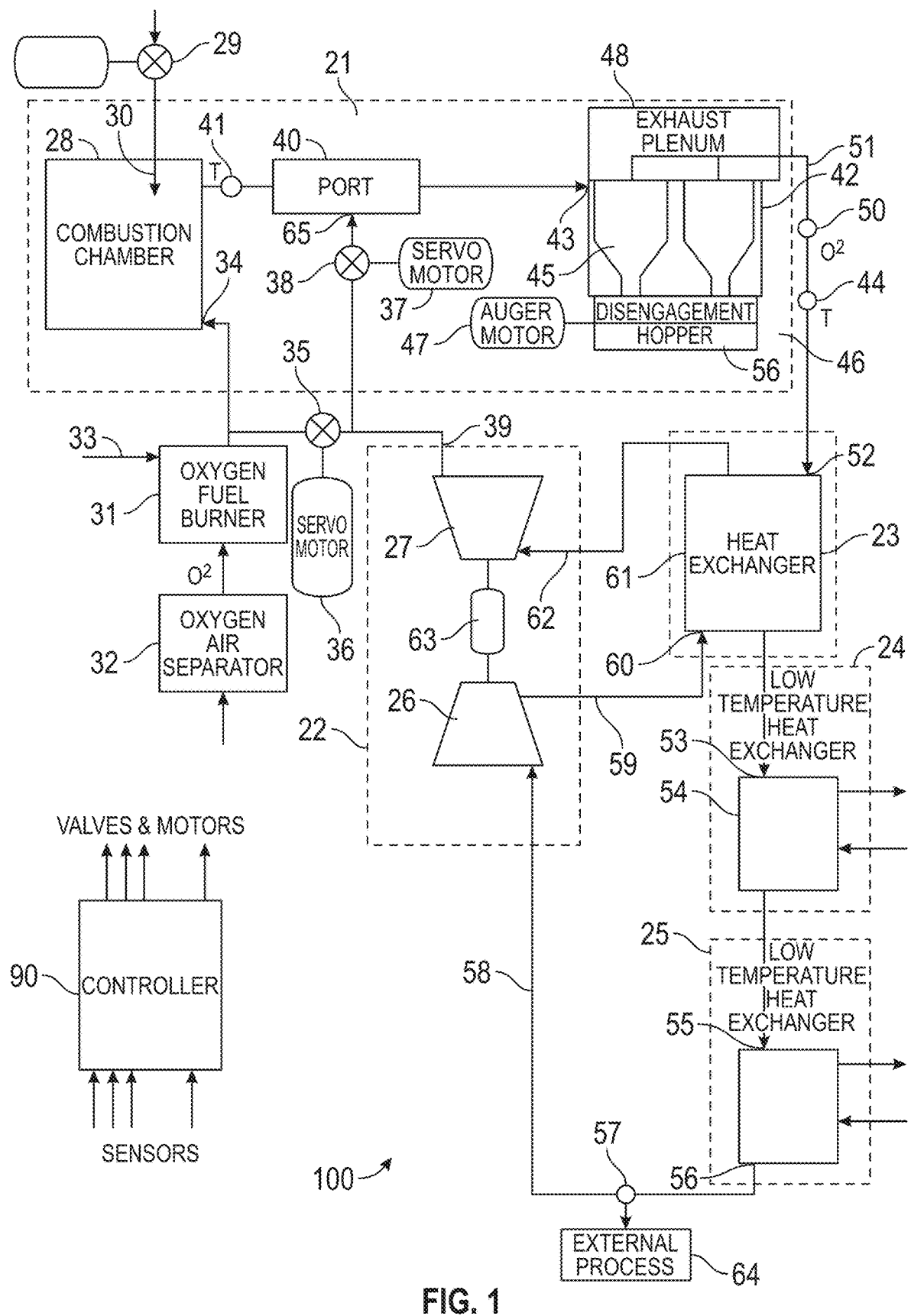
FIG. 1 is a schematic block diagram illustration of a combined heat and power system in accordance with an embodiment.

Embodiments of the present disclosure is a power system having an indirect, oxy/solid organic fired, closed, recuperated CO2 Brayton cycle. In this system solid organic fuel is combusted at atmospheric pressure inside a combustion chamber utilizing high-purity oxygen (93%-99.5% O2) as the oxidizer. The oxygen is provided by an air separation unit. The system is a closed loop using CO2 as the working fluid for the turbine and the heat transfer fluid to carry the heat from the combustion chamber to the turbine. CO2 gas coming from the turbine exhaust is partially routed through the combustion chamber where the oxygen and the solid fuel are combusted. The hot combustion gases comprising mostly CO2 then goes into a mixing plenum where a portion of the cooler turbine exhaust gas is mixed with the hot combustion gas to reduce the temperature of the gas. The mixed gas then goes through a particle separator to remove inorganic solids and then through a recuperator where the heat/thermal-energy is transferred to the compressed CO2 gas from the compressor. The hot compressor gas is then expanded to produce power before going back to the combustion chamber. The combustion gas leaving the recuperator is at a lower temperature but still has usable heat for thermal applications and is then cooled before going to the inlet of the compressor. In some embodiments, the cooling of the exhaust gas can be achieved with a water cooled heat exchanger to approach atmospheric temperature or by using the heat in an absorption chilling cycle to cool the exhaust gas to 0 degrees C. or lower.

As organic material is oxidized into CO2 and water, the additional mass would increase the pressure of the system. A pressure control valve is located on the low pressure side of the system and is used to set the lower or minimum operating pressure of the system. As pressure increases due to additional mass, the control valve allows cooled CO2 gas to exit the system. This maintains a constant average pressure in the system while extracting the excess CO2. The gas leaving the system is substantially CO2 with trace amounts of CO, water and other contaminants which are then removed through subsequent processing to produce pure CO2 for reuse, conversion or sequestration.

The present system provides many advantages including the use of an oxy-fuel combustion system to oxidize the solid organics. This reduces or eliminates the nitrogen from the system, provides a byproduct of CO2 which is used as the working gas and reduces or eliminates the need to separate CO2 from the exhaust gas that would normally be mixed with air.

One advantage in using CO2 for the working gas instead of air is at atmospheric pressure and temperature, CO2 is 60% denser than air. Since there is no change in volume flow through the system the added density represents a 60% increase in mass flow resulting in 60% more power for the same equipment.

Another advantage of the present system that is the heat capacity ratio (Cp/Cv) for CO2 is lower than air. This means for the same pressure ratio the differential temperature across the compressor and expander is lower for CO2 than air. This results in a higher differential temperature across the recuperator and in turn higher thermo-electric efficiency over air for the same T hot and T cold temperatures.

Another advantage of the present system is that by using oxygen, the oxygen/fuel ratio can be controlled independently from the turbine speed and power. This allows for more complete combustion over a wider range of operating conditions such as with part load conditions.

Another advantage is the exhaust output is captured CO2 and condensed water. This reduces the need for or eliminates the exhaust stack associated with air cycle power systems and in turn reduces the need for or eliminates the requirement to permit the power system for emissions.

Another advantage of the present system is that the output is nearly pure CO2 (>98%) and uses a small amount of post processing to make the CO2 useable for secondary use such as welding gas, food and beverage, dry ice, liquid CO2 or conversion into many other carbon products.

Operation of the CHP system begins with starting the turbine at a desired lower speed, such as 20% of full speed for example. The valve from the turbine to the combustion chamber is open and the valve from the turbine to the mixing plenum is closed which directs all the flow to the combustion chamber. Ignition begins with a gaseous fuel (methane, propane, syngas) fed to an oxy-fuel burner. Oxygen gas being supplied by an air separation unit. The burner delivers heat to the flowing gas to increase the temperature of the system. As the combustion temperature rises the turbine speed is increased to maintain the differential temperature across the first heat exchanger within limits. When the temperature in the combustion chamber reaches a desired temperature, such as 600 C for example, solid fuel is fed into the combustion chamber and the gaseous fuel is turned off. Oxygen continues to be fed proportional to the solid fuel to maintain a desired oxygen/fuel ratio for stoichiometric combustion. Fuel and oxygen rate are increased to increase system temperature. When the combustion chamber temperature reaches a desired operating temperature, such as 800 C for example, the valve to the mixing plenum begins to open. A temperature sensor located on the first heat exchanger inlet and connected to the plenum valve, controls the temperature of the gas leaving the mixing plenum. The temperature of the combustion chamber continues to rise until reaching a desired temperature, such as >1000 C for example, to provide a desired level of combustion. A temperature sensor at the outlet of the combustion chamber and connected to the combustion chamber valve, controls the combustion chamber temperature. As the temperature is rising to the operating temperature the turbine speed is increased to maximum speed and power. Once operating temperatures are reached, power is controlled by torque control of the generator and by modulating the fuel feed and oxygen rate into the combustion chamber.

In still further embodiments, one or more embodiments are provided that are a combined heat and power system, utilizing waste organic resources and converting it into heat energy used to drive a gas turbine coupled to the thermal system to produce power and a high level of usable waste heat for both low and high temperature thermal applications.

Referring now to FIG. 1, a combined heat and power system (CHP) 100 in accordance with an embodiment. The CHP system 100 utilizes a combustion system 21, a closed cycle Brayton gas turbine 22, a high temperature cyclone particle separator 42, a high temperature heat exchanger 23 to transfer heat generated in the combustion system 21 into the turbine 22 and low temperature heat exchangers 24, 25.

Indirect fired power systems typically utilize at least one heat exchanger in order to transfer heat from the combustion process to the working gas of the engine. Depending on the type of engine cycle, the heat transfer will occur at different temperatures. For cycles such as Organic Rankine the temperature delivered to the engine is rarely above 500° C. and is more typically below 250° C. The advantage of using an ORC is that it can utilize lower temperature heat and subsequently lower cost heat exchangers. The disadvantage is lower efficiency, higher cost, and low temperature waste heat rejected from the cycle, typically less than 90° C., which is not readily utilized elsewhere.

Therefore, it is often desired to use a higher temperature cycle such as an open Brayton cycle to more directly and efficiently utilize the high temperatures available from the combustion system 21. Current Brayton turbine engines are designed to utilize heat at about 950° C. The advantages of the higher temperature cycle are higher efficiency, lower cost and high temperature waste heat rejected from the cycle typically as high as 600° C.

In an embodiment, the combustion system 21 further includes, but is not limited to, a combustion chamber or housing 28 for burning of organic fuel to generate heat. Biomass fuels, that is, organic materials include, for example, woody fuels such as wood chips, saw grass, and the like, animal wastes, i.e., manures, non halogenated plastics or even municipal solid waste (MSW). The combustion chamber 28 also includes an opening, valve, or port 29 for delivering the fuel into the combustion chamber 28. In embodiment, an air oxygen separator 32 is provided that extracts oxygen from the air and transfers the oxygen gas to an oxygen-fuel burner 31 that receives (during a startup mode of operation) a gaseous fuel 33 (e.g. propane, natural gas, methane, etc.) and ignites or burns the oxygen-fuel mixture to generate a combustion gas. This combustion gas is mixed with a working fluid/gas from conduit 39 and is transferred to the combustion chamber 28 via a port 34. As discussed in more detail herein, the gaseous fuel 33 is used during a startup mode of operation and is then stopped when predetermined operating conditions have been achieved. The temperature of the combustion gas from the oxygen-fuel burner 31 is sufficient to initiate combustion of the biomass within the combustion chamber 28. In at least some embodiments herein, the oxygen gas continues to flow to the combustion chamber 28 under both startup and when the predetermined operating conditions have been achieved to sustain combustion in the combustion chamber without the addition of fuel 33. In some embodiments, during steady-state operations, the O2 gas flow is regulated by the air-oxygen separator 32. In an embodiment, a port 34 may be configured to also deliver CO2 gas from the turbine 22 via proportional valve 35, which meters the combustion gas from the turbine 22, The combustion system 21 also includes a valve 29 for metering the mass of the solid fuel directed into the combustion chamber 28, a temperature sensor e.g., thermocouple 41 is used to measure combustion exhaust temperature and a controller 90 to receive various sensor inputs such as temperatures, valve positions, speeds and the like, as well as to control the various valves and electric motors in the system 100.

It should be appreciated, and as is discussed herein, the output gas from the combustion chamber 28 is mostly CO2 (90%-98% CO2), CO, N2, particulates and water vapor. Combustion gas from the combustion chamber passes through a conduit to a mixing plenum 40. The mixing plenum 40 also includes a port that receives expanded gas via a proportional valve 38 from the turbine 22. The mixing plenum 40 passes a heated combustion gas/working-gas, gas stream to a downstream conduit that includes a temperature sensor or thermocouple 44 that measures the heated combustion gas/working-gas gas stream and provides a feedback signal to the controller 90. High temperature mixed gas is transferred via port 43 to a particle separator 42.

In an embodiment, the particle separator 42 further includes a housing with one or more cyclones 45, a disengagement hopper 56 for particulate collection, a mechanical auger 46 for removing particles from the hopper 56, and a motor 47 to drive the auger 46. The particle separator 42 is designed to operate at the maximum heat exchanger temperature about 850° C. and is constructed of materials capable of operating at such temperatures and also designed to be resistant of the abrasive and corrosive effects of the combustion gas. In an embodiment, the particle separator 42 is constructed of Nickel alloy metal that provide thermal shock resistance, abrasion resistance and high temperature strength properties. Cyclone particle separator may be a reverse flow, uniflow or other type of cyclone configuration. The cyclone particle separator 42 also includes an exhaust plenum 48 coupled to a conduit 51 that includes an oxygen sensor 50 that provides a feedback signal to the controller 90.

The CHP system 100 also includes a high temperature heat exchanger 23 which includes a first port 52 for directing hot combustion gas into the heat exchanger 23, an outlet port for directing cold combustion gas out of the heat exchanger 23, an input port 60 for directing cold compressor air into the heat exchanger 23 and a port 61 for directing hot air from the heat exchanger 23 into the expansion turbine 27. The high temperature heat exchanger 23 is configured to operate at temperatures as high as about 1000° C. Heat exchangers capable of operating in the high temperature range needed for this application operate near the structural limits of the metals employed, typically made of stainless steel or nickel alloys. Therefore, careful accurate control of the temperature of the combustion gases provides that the desired temperature limits of the high temperature heat exchanger 23 materials are not exceeded. In addition, control of the differential temperature between the exhaust gas entering the high temperature heat exchanger 23 and the working gas leaving the heat exchanger 23. The lower the differential temperature is the lower the maximum working temperature of the heat exchanger. Lower differential temperatures reduce stresses in the high temperature heat exchanger 23, prolonging its life. For example, with a desired turbine inlet temperature of 900° C. the combustion gas would be delivered at 960° C. for a given effectiveness.

In an embodiment, a single counter flow heat exchanger is employed to improve the thermal electric efficiency of the CHP system 100. It will be appreciated that other heat exchanger configurations are possible. In an embodiment a stainless steel or nickel alloy, single counter flow micro channel, plate or tube style heat exchanger is employed, however, other types may be utilized as well, including, but not limited to, tube and shell, micro tube, microchannel, plate types, and the like. In an embodiment, the high temperature heat exchanger may be constructed of ceramic or nickel alloy steel. Advantageously, ceramic heat exchangers can operate at temperatures in excess of 1100° C. while conventional metal heat exchangers typically cannot exceed 900° C. While ceramic heat exchangers have several advantages, in an embodiment a metallic heat exchanger is employed. The control of the combustion gas temperature entering the high temperature heat exchanger 23 reduces cost in two ways. The first is that tightly controlling the temperature of the combustion cases to the high temperature heat exchanger 23 ensures the ability to use metal heat exchangers instead of ceramic heat exchangers which are significantly more expensive. Ceramic heat exchangers can be 200% more expensive than Nickel alloy. In some cases it allows for the use of stainless steel instead of more costly Nickel alloys. The second cost savings is in extended life of the heat exchanger lowering the maintenance cost over time. Power generation equipment typically has an expected twenty year service period. Reducing thermal stresses with well controlled combustion gas temperatures will ensure extended operation of the heat exchangers and achieve a 25% reduction in maintenance cost over the life of the power plant.

In an embodiment, lower temperature gas exits the high temperature heat exchanger 23 and passes through one or more low temperature heat exchangers 24, 25 that further lowers the temperature of the CO2 gas for use in ancillary operations (not shown). In an embodiment a first low temperature heat exchanger 24 receives the CO2 gas via a port 53 at a temperature of about 250° C. and exits via an output port 54 at a temperature of about 100° C. In an embodiment, a second low temperature heat exchanger receives the CO2 gas via a port 55 and further extracts thermal energy from the CO2 gas. In an embodiment, the CO2 gas exits the second low temperature heat exchanger at a temperature of about 0° C. to near ambient temperature. Heat exchanger 25 is configured to remove condensed water from the working gas. In an embodiment, the heat exchanger 24 functions as a heat source for an absorption chiller and heat exchanger 25 is a cold heat exchanger for transferring non-usable heat from the working fluid/gas.

It should be appreciated that the CHP system 100 is typically operated as a closed loop system, meaning the generated CO2 gas is re-used or recirculated within the system. It should further be appreciated that by adding the bio-mass fuel and the oxygen gas to the combustion chamber, the additional mass will increase the pressure within the CHP system 100. In an embodiment, a control valve 57 receives the low temperature low pressure CO2 gas stream from the second low temperature heat exchanger 25. The control valve 57 is configured to maintain a substantially constant pressure within the system 100 by selectively diverting a portion of the CO2 gas stream to an external process 64. In an embodiment, the external process 64 receives the CO2 gas stream, which is substantially CO2 with trace amounts of water and other contaminants, for further processing. In one embodiment, the gas stream is filtered to remove the water and contaminants to a desired level. The then substantially pure CO2 gas may be reused, converted, or sequestered. In an embodiment, the CO2 gas is converted to a welding gas, used in a food or beverage process, converted into dry ice, or liquefied to generate liquid CO2 for example.

The remaining low temperature CO2 gas stream is transferred via conduit 58 to the closed cycle Brayton gas turbine 22. In an embodiment, the closed cycle Brayton gas turbine system 22 further includes a turbine compressor 26 to compress the low temperature CO2 gas stream from conduit 58, a fluid connection 59 from the turbine compressor outlet to the heat exchanger input port 60 that carries compressed CO2 gas to the high temperature heat exchanger 23. The gas turbine system 22 also includes a fluid connection 62 from the high temperature heat exchanger 23 outlet port 61 to the expansion turbine 27 inlet. The turbine expander 27 operates to expand the CO2 working gas and produce usable work, for example turning a generator to generate electricity. The turbine system 22 also includes a fluid connection from the outlet of the expansion turbine 27 that is fluidly coupled to the proportional valves 35, 38. In an embodiment, the turbine system may also include a generator connected to the shaft of the turbine to produce electrical power.

Figure 2:
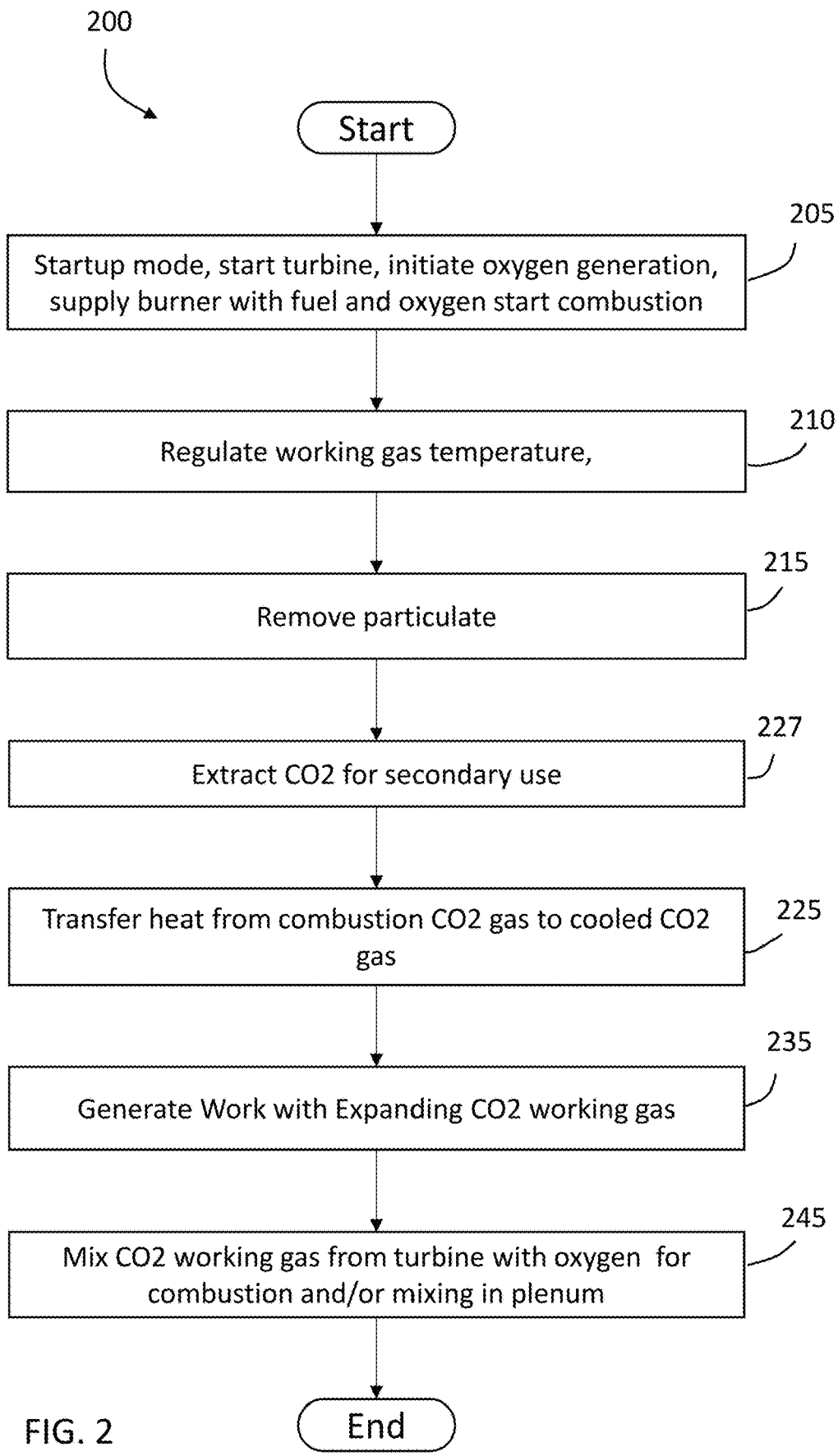
FIG. 2 is a flow chart depicting a method of controlling a combined heat and power system in accordance with an embodiment.

Referring now to FIG. 2, with continuing reference to FIG. 1, an embodiment of a process 200 is shown for controlling CHP system 100. The method 200 starts in block 205 by starting operation of the turbine 22, turning on the oxygen air separator 32 and injecting fuel 33 into burner 31. The oxygen-fuel mixture is combusted/burned, mixed with the working fluid from turbine 22 (via conduit 39) and delivered into the combustion chamber 28. In an embodiment, the oxygen-fuel combustion gas mixture is pre heated prior to injection into the combustion chamber 28. When the combustion chamber 28 is heated to a selected temperature, solid fuel (e.g. a biomass) can be introduced through the valve 29 and combusted. In an embodiment the temperature to introduce fuel is selected to be 600° C., however, other temperatures may be employed.

As the combustion process continues the combustion gas temperature increases to the working temperature of the combustion system 21. The proportional valve 35 controls the mass flow of the working gas and the burner valve 31 the mass flow of oxygen entering the combustion port 34 in the combustion chamber 28. The proportional valves 31, 35 can be any automatically controlled valve including butterfly, gate, ball, flapper or other mechanical system. The proportional valve 35 may be driven by a servo motor 36 connected to the valve 35. The proportional valve 35 can be driven by a DC servo motor 36, hydraulically, pneumatically or by other electro-mechanical position systems. The servo motor is connected to the controller 90 and is driven by a signal from the controller 90.

Combustion systems which utilize organic materials commonly control the air/fuel ratio by means of an oxygen or Lambda sensor 50 which provides a feedback signal to the controller 90. The controller 90 includes one or more processors responsive to executable instructions to execute control methods to either vary the fuel (via valve 29) and/or oxygen (from oxygen air separator 32) that is being supplied to the combustion chamber 28. In a CHP system 100 the oxygen sensor 50 may be used to insure a positive oxygen/fuel 33 ratio during startup mode and during normal operation with organic material.

One method of controlling the heat rate in a CHP combustion system 28 utilizing a proportional valve 35 that can vary the combustion gas flow over a range, for example, from 0%-100%. In operation when burning organic material with consistent moisture content the proportional valve 35 supplies sufficient mass flow to absorb the heat from the combusted organic material to meet the thermal demand called for. When all conditions are constant there is little need to control the air/fuel except when a change in demand is made.

In an embodiment, the target working temperature for the combustion process is about >1000° C., depending on the type of combustion chamber and fuel being employed. It will be appreciated that other combustion working temperatures are possible. It will be appreciated that the desired working temperature for the combustion process may be selected based on several factors. Higher temperatures are commonly desired for complete combustion of the fuel with lower amounts of particulate emissions. Conversely, lower temperatures may be desirable for downstream components such as heat exchangers, and the like.

The combustion gas temperature is measured at the exit by a temperature sensor 41 e.g. thermocouple, IR sensor semiconductor sensor, and the like, which is used to control both feed rate of fuel to the combustion chamber 28 as well as the hot temperature gas to be directed to downstream processes. In an embodiment, the controller 90 has a defined set point temperature of what average combustion temperature should be. In an embodiment, the controller 90 employs a time averaged temperature measurement to control valve 29 to control the feed rate of the fuel. By using a time averaged temperature measurement for control of the valve 29 allows the valve 29 to maintain a more constant flow rather than responding to fluctuations in the output temperature of the combustion gas. The gas temperature leaving the combustion chamber 29 can be as high as 1050° C. which may exceed the maximum temperature for the heat exchangers. However, the high temperature is desirable in order to achieve complete combustion and eliminate un-burnt hydrocarbon emissions.

When the CO2 gas exits the combustion chamber 28, the method 200 proceeds to block 210 where the gas stream enters into a portion of the system which regulates the temperature of the working fluid to the high temperature heat exchanger 23. In an embodiment hot working fluid/gas from turbine 27 is directed through conduit 39 and enters the mixing plenum 40. The mixing plenum 40 mixes hot combustion gas from combustion chamber 28 with the relatively cooler working fluid/gas from turbine 27 in order to control the temperature of the working fluid/gas going to heat exchanger 23. In an embodiment, the gas temperature to heat exchanger 23 is dependent on a threshold working temperature rating of the heat exchanger. The mixing plenum 40 provides advantages in allowing for control of the combustion chamber 28 temperature independent from the temperature of the heat exchanger 23.

In an embodiment, the temperature sensor 44 senses the temperature of the combustion gases entering the mixing plenum 40 and is used to provide a feedback signal to controller 90 that actuates control valve 38. The control algorithm will open or close valve 38 in response to the deviation from the set point temperature. A PID control loop is used to modulate the valve position in response to temperature sensor 44 to adjust the position and sensitivity of the valve 38. In an embodiment, the controller 90 responds to deviations from the heat exchanger 23 set point temperature with a proportional damping of the rate change signal on proportional valve 38. In an embodiment the temperature of the combustion gases exiting the plenum 40 are regulated to the maximum temperature capability of the high temperature heat exchanger 23. In an embodiment, the temperature of the combustion gases are regulated to about 900° C. In another embodiment, the temperature of the combustion gases are regulated to 800° C. In an embodiment the temperature is regulated with a tolerance of ±100° C. In another embodiment the tolerance is ±50° C. In yet another embodiment the temperature is maintained within a range of ±10° C.

When the CO2 gas exits the mixing plenum 40, the method 200 proceeds to block 215 where the gas stream enters into a particle separator or filter 42 to separate particulate matter from the combustion gases. In an embodiment a high temperature cyclone particle separator is employed, although other forms of particle separators filters and the like may be utilized. In an embodiment, the high temperature cyclone particle separator is configured to ensure that 99% of particles above 10 microns in size are removed from the hot combustion gases. As the gas passes through the cyclones 45, particles are accelerated towards the outer shell and travel down the length of the cyclone. At the bottom of the cyclone(s) 45 the particles fall out of suspension into the disengagement hopper 56. In an embodiment, the particles collected in the disengagement hopper 56 are removed by a mechanical auger 46 and motor 47. The auger motor 47 can be run intermittently or continuously depending on the quantity of inorganic material in the solid fuel, the size of the auger 46 and hopper 56. The gas then continues up the center of the cyclone(s) 45 and exits the top into the exhaust plenum 48.

Control of the CHP combustion system 100 and the secondary air valve 38 begins with the electric load on the turbine 22 and the load/generator (if any). The turbine speed will change in response to the electrical load which changes the working gas flow through the expansion turbine 27, and thereby the working gas being heated in the high temperature heat exchanger 23. The high threshold turbine inlet temperature is limited by the heat exchanger temperature limit/rating and efficiency. In an embodiment, a temperature sensor 44 senses the working gas temperature leaving the mixing plenum 40. This temperature may be a constant set point temperature. In order to maintain the set point temperature, the combustion gas flow to the high temperature heat exchanger 23 may be adjusted based on changes in temperature detected at temperature sensor 44 to deliver the correct amount of energy. This is accomplished by the controller 90 varying the fuel through valve 29 to the combustion chamber 28 to provide the desired energy.

Temperature sensor 41 may be used to control the temperature of the combustion gases leaving the combustion chamber. It measures the instantaneous temperature of the gas and sends this to the controller 90. The time averaged value is used to compare with the combustion chamber 28 set point value and controls the amount of fuel and oxygen to maintain a desired set point temperature. The instantaneous value may be compared to the set point value in order to determine the amplitude of the deviation from the set point value. When temperature sensor 41 senses a deviation from the set point temperature, controller 90 begins to adjust valve 35 in anticipation of the exhaust gas reaching the plenum 40. Oxygen sensor 50 provides a feedback signal to controller 90 to insure a positive oxygen/fuel 33 ratio during a startup mode and normal/continuous/stead-state operation. In an embodiment, the controller 90 adjusts at least one of the amount of oxygen gas from oxygen-air separator 32, the amount of heated expanded $CO_2$ working gas from the proportional valve 35 or the amount of solid fuel from valve 29 in response to the signal from oxygen sensor 50.

In a startup mode, the proportional valve 35 is fully open and proportional valve 38 is fully closed until the temperature measured by the temperature sensor 41 measuring the temperature of the combustion gases exiting the combustion chamber 28 exceeds the desired inlet set point temperature for the heat exchanger 23. As the proportional valve 38 is opened, the heated gas from the expansion turbine 27 on line 39 is mixed with the combustion gases in the mixing plenum 40 to maintain and regulate the high temperature combustion gases directed to the high temperature heat exchanger 23 at a substantially constant temperature within a desired tolerance. The proportional valve 38 controls the mass flow of the hot working gas entering the secondary port 65 prior to the particle separator 42. The proportional valve 38 can be any automatically controlled valve including butterfly, gate, ball, flapper or other mechanical system. The servo motor 37 is connected to the controller 90 and is driven by a signal by the controller 90.

The method 200 proceeds to block 225 where, as the hot combustion gases pass through the high temperature heat exchanger 23, heat is transferred from the combustion gases to the $CO_2$ working gas of the turbine 22. In an embodiment, after transferring heat to the working gases the combustion gases may then be utilized for secondary purposes to improve the efficiency and effectiveness of the CHP system 100. In an embodiment, combustion exhaust gas temperatures exiting the high temperature heat exchanger 23 can be as high as about 300° C. However, it will be appreciated that the temperature of the exhaust gases leaving the high temperature heat exchanger 23 depends on heat exchanger efficiency. High heat exchanger efficiency will lower the exhaust temperature. In addition, the temperature of the exhaust gas entering the high temperature heat exchanger 23 will have an impact. In applications where the exhaust gas entering the high temperature heat exchanger 23 is regulated to a lower temperature e.g. 800° C., the temperature exiting the heat exchanger 23 will be lower.

The secondary purpose for the use of combustion gases is to provide usable high temperature heat. In an embodiment the combustion gases may be passed through a second low temperature heat exchanger 24 and a third low temperature heat exchanger 25 which is used to reject further heat from the combustion gases. Examples of lower temperature applications that could be utilized from heat exchanger 24 are processes include power generation for example in a second cycle ORC system to generate further work or electricity, hot water, absorption chilling, low temperature drying applications sludge drying, thermal water purification and for space heating and cooling and the like. In an embodiment heat exchanger 24 would be used in an absorption cooling system (e.g. an absorption chiller) to provide a cold heat sink for heat exchanger 25. Heat exchanger 25 reduces the $CO_2$ gas temperature to about 0° C. which results in the water condensing out of the gas and can be removed at heat exchanger 25. Further cooled combustion gases leave the low temperature heat exchanger 25.

As discussed herein, in an embodiment in block 227 the cooled $CO_2$ gas leaving the heat exchanger 25 is regulated by a valve 57 and a portion of the cooled $CO_2$ combustion gas is withdrawn from the system 100 to maintain a desired pressure level within the system due to the addition of fuel via valve 29 and oxygen from oxygen air separator 32. This extraction of $CO_2$ gas may be used for a variety of secondary end uses 64 as described herein. The remaining cooled $CO_2$ gas is routed via conduit 58 to the turbine 22.

The starting of the turbine 22 can be accomplished with a starter motor/generator 63. In one embodiment, the turbine 22 is motored and as the $CO_2$ gas is routed via conduit 59 to the high temperature heat exchanger 23 where the $CO_2$ working gas is heated, and the working gas expands (block 235) towards the expansion turbine 27. As the shaft turns and gas flows through the compressor turbine 26, $CO_2$ gas starts to flow and the compressed $CO_2$ will expand further accelerating the flow and the system over time will spool up with increasing heat. Control of the motor/generator speed may be accomplished by torque control. As the turbine 22 begins to turn, heated expansion turbine exhaust gas is available on line 39 to provide secondary gas for the valve 38 and port 64 and for primary combustion gas via valve 35 for the combustion system port 34 (block 245).

While the turbine speed is increasing, the primary combustion gas fed to the combustion chamber 28 is also increasing. In an embodiment, during a startup mode, the primary combustion gas will be a gaseous fuel 33 (e.g. propane, natural gas, methane) in combination with oxygen from oxygen air separator 32. The thermocouple 41 will sense a change in combustion exhaust gas temperatures and will send a signal to the controller 90 to change the rate of feed of the solid fuel by changing the speed of the rotary valve 29 and the oxygen rate from air separation unit 32 to regulate the combustion system and continue the cycle. In another embodiment the proportional valve 35 is controlled to maintain the gas flow allowed by the combustion chamber line 39 and receive the heat from combustion. As the fuel feed rate increases/decreases to meet load demand, control of the primary combustion gas is performed by the proportional valve 35. During an operating mode/state, the gaseous fuel 33 is stopped/discontinued.

As the system 100 reaches thermal equilibrium the proportional valve 35 is set to allow the sufficient gas-flow to maintain the desired combustion temperature. The fuel system responds to the load placed on the turbine 22. In an embodiment, as power is demanded, the turbine 22 will pull heat from the high temperature heat exchanger 23. The temperature sensors in line 41 and 44 senses a change in temperature of the hot gasses feeding the heat exchanger and either calls for more or less fuel to be combusted depending on the power demand. The controller 90 commands the rotary valve 29 accordingly, increasing or decreasing its speed to allow/maintain sufficient fuel energy to provide the heat required to maintain the set point temperature sensed in conduit 51. In response to changes in fuel rate, lambda sensor 50 sends a signal to controller 90 to maintain the desired oxygen demand from air separation unit 32 in order to achieve complete combustion. The proportional valve 35 is controlled by the controller 90 using several signal inputs and a Proportional Integral Derivative (PID) positioning control algorithm and signal. Temperature sensor 41 measures the combustion chamber 28 outlet temperature, which is maintained at a desired combustion temperature of about 1000° C. to achieve a desired level of combustion.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting. While the invention has been described in detail in connection with only a limited number of embodiments, it should be readily understood that the invention is not limited to such disclosed embodiments. Any number of variations, alterations, substitutions or equivalent arrangements not heretofore described, but which are commensurate with the spirit and scope of the claims. Additionally, while various embodiments have been described, it is to be understood that aspects of the invention may include only some of the described embodiments. Accordingly, embodiments are not to be seen as limited by the foregoing description, but is only limited by the scope of the appended claims.

What is claimed is:

1. A combined heat and power (CHP) system, the CHP system comprising:
    an oxygen-air separation device;
    a combustion system having a combustion chamber and a solid fuel feed mechanism, the combustion chamber having an gas inlet and an output conduit, the gas inlet being fluidly coupled to the oxygen-air separation device, the combustion chamber configured to generate a CO2 exhaust gas that substantially comprises CO2 gas;
    a first proportional valve fluidly coupled to the gas inlet and configured to control a flow of expanded heated CO2 working gas to the gas inlet, the expanded heated CO2 working gas comprising at least a portion of the CO2 exhaust gas;
    an exhaust plenum operatively connected to the combustion chamber;
    a high temperature heat exchanger operably coupled to the exhaust plenum and fluidly coupled to receive CO2 exhaust gas therefrom and output a cooled CO2 working gas, the high temperature heat exchanger transferring heat from the combustion gases to a compressed CO2 working gas;
    a gas turbine having a compression section and an expansion section operably connected on a drive shaft, the compression section receiving the cooled CO2 working gas at an inlet and compress the cooled CO2 working gas, the compression section also flowing the compressed CO2 working gas to an inlet of the high temperature heat exchanger, the gas turbine receiving a heated CO2 working gas at an inlet to the expansion section and expanding the heated CO2 working gas and generate work therefrom.

2. The CHP system of claim 1, further comprising a mixing plenum fluidly coupled between the combustion chamber and the exhaust plenum, the mixing plenum being fluidly coupled to the expansion section.

3. The CHP system of claim 1, further comprising a second proportional valve coupled between the expansion section and the mixing plenum.

4. The CHP system of claim 1, further comprising a temperature sensor, the temperature sensor measuring the temperature of the CO2 exhaust gas.

5. The CHP system of claim 4, wherein the temperature sensor is at least one of a thermocouple, infrared detector and a semiconductor detector.

6. The CHP system of claim 1, further comprising a mixing valve fluidly coupled to the first proportional valve, the oxygen-air separation unit, and the gas inlet.

7. The CHP system of claim 6, wherein the mixing valve is further fluidly coupled to a gas fuel source.

8. The CHP system of claim 1, further comprising a control valve fluidly coupled between an outlet of the high temperature heat exchanger and the gas turbine inlet, the control valve being configured to extract a portion of the cooled CO2 working gas.

9. The CHP system of claim 8, further comprising an external process device fluidly coupled to the control valve.

10. The CHP system of claim 9, wherein the external process device includes a filter device configured to output a purified CO2 gas.

11. The CHP system of claim 10, wherein the external process device further includes at least one of: a compressor, a compressed gas storage system, a CO2 liquefaction system, a dry ice generator, and a solid carbon conversion process.

12. The CHP system of claim 1, further comprising an oxygen sensor arranged to measure oxygen content of a gas flowing between the exhaust plenum and the high temperature heat exchanger.

13. The CHP system of claim 1, further comprising a high temperature particle separator having an inlet and an exhaust, the high temperature particle separator fluidly coupled to the combustion chamber, the high temperature particle separator further including the exhaust plenum.

14. The CHP system of claim 13, wherein the high temperature particle separator includes at least one cyclonic separator, the cyclonic separator operably coupled to a hopper for removal of particulate matter.

15. A method of operating a combined heat and power (CHP) system, the method comprising:
    during a startup mode, initiating a combustion process in a combustion chamber and combusting a solid fuel with an oxygen-fuel gas to generate an exhaust gas comprised of substantially CO2 gas;
    regulating a temperature of the exhaust gas with an expanded heated CO2 working gas and generating a mixed CO2 combustion gas;
    transferring with a heat exchanger thermal energy from the mixed CO2 combustion gas and generating a cooled CO2 working gas;
    compressing the cooled CO2 working gas to generate a compressed CO2 working gas;
    heating the compressed CO2 working gas with the thermal energy to generate a compressed heated CO2 working gas;

generating work by expanding the compressed heated CO2 working gas; and generating the expanded heated CO2 working gas.

16. The method of claim 15, further comprising, during the startup mode, generating oxygen gas and mixing a fuel gas to generate the oxygen-fuel gas.

17. The method of claim 16, wherein the fuel includes at least one of propane, natural gas, or methane.

18. The method of claim 15, further comprising, during an operating mode, flowing at least a portion of the expanded heated CO2 working gas to the combustion chamber.

19. The method of claim 18, further comprising, during the operating mode, extracting at least a portion of cooled CO2 working gas.

20. The method of claim 19, further comprising maintaining a substantially constant pressure within the system by extracting the at least a portion of cooled CO2 working gas.

21. The method of claim 19, further comprising performing at least one of the following extracting the portion of cooled CO2 working gas:

compressing and storing the portion of cooled CO2 working gas;

filtering the portion of cooled CO2 working gas;

liquefying the portion of cooled CO2 working gas; or forming dry ice from the portion of cooled working gas.

* * * * *